US009055298B2

(12) United States Patent
Chen et al.

(10) Patent No.: US 9,055,298 B2
(45) Date of Patent: Jun. 9, 2015

(54) VIDEO ENCODING METHOD ENABLING HIGHLY EFFICIENT PARTIAL DECODING OF H.264 AND OTHER TRANSFORM CODED INFORMATION

(75) Inventors: Peisong Chen, San Diego, CA (US); Seyfullah Halit Oguz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1536 days.

(21) Appl. No.: 11/527,022

(22) Filed: Sep. 25, 2006

(65) Prior Publication Data

US 2007/0083578 A1  Apr. 12, 2007

Related U.S. Application Data

(63) Continuation-in-part of application No. 11/182,621, filed on Jul. 15, 2005, now abandoned.

(60) Provisional application No. 60/721,377, filed on Sep. 27, 2005.

(51) Int. Cl.
*H04N 7/12* (2006.01)
*H04N 19/48* (2014.01)
*H04N 19/593* (2014.01)
*H04N 19/895* (2014.01)

(52) U.S. Cl.
CPC ............. *H04N 19/48* (2014.11); *H04N 19/593* (2014.11); *H04N 19/895* (2014.11)

(58) Field of Classification Search
USPC ..................................... 375/240.03, 12, 18, 2

IPC .......................................................... H04N 7/12
See application file for complete search history.

(56) References Cited

U.S. PATENT DOCUMENTS 5,243,428 A * 9/1993 Challapali et al. ............ 348/607
5,434,623 A * 7/1995 Coleman et al. ......... 375/240.04
5,621,467 A    4/1997 Chien et al.
(Continued)

FOREIGN PATENT DOCUMENTS

JP    1141481 A    6/1989
JP    8256311      10/1996
(Continued)

OTHER PUBLICATIONS

Taiwan Search Report—TWO95135856—May 26, 2010.
(Continued)

*Primary Examiner* — Tracy Li
(74) *Attorney, Agent, or Firm* — Arent Fox LLP

(57) ABSTRACT

Methods and apparatus to process multimedia data enabling efficient partial decoding of transform coded data are described. A decoder device receives transform coefficients, where the transform coefficients are associated with multimedia data. The decoder device determines a set of multimedia samples to be reconstructed. In one aspect, the set of samples to be reconstructed is a subset of a matrix of transformed multimedia samples. The decoder device determines a set of transform coefficients to be used to reconstruct the multimedia samples. In one aspect, the transform coefficients are used to scale partial basis images associated with the encoding method used to generate the transform coefficients, resulting in reconstructed multimedia samples.

50 Claims, 9 Drawing Sheets

(56) References Cited

U.S. PATENT DOCUMENTS

| | | | |
|---|---|---|---|
| 5,944,851 | A | 8/1999 | Lee |
| 6,046,784 | A | 4/2000 | Lee |
| 6,175,597 | B1 | 1/2001 | Ozcelik et al. |
| 6,404,817 | B1 | 6/2002 | Saha et al. |
| 6,539,120 | B1 * | 3/2003 | Sita et al. .................. 382/233 |
| 6,654,544 | B1 * | 11/2003 | Suzuki et al. ............... 386/329 |
| 7,693,345 | B2 * | 4/2010 | Pore et al. ................... 382/275 |
| 2002/0141502 | A1 | 10/2002 | Lin et al. |
| 2003/0202582 | A1 * | 10/2003 | Satoh ........................ 375/240.03 |
| 2004/0039464 | A1 | 2/2004 | Virolainen et al. |
| 2005/0157799 | A1 * | 7/2005 | Raman et al. ............ 375/240.27 |
| 2005/0175091 | A1 | 8/2005 | Puri et al. |
| 2006/0013320 | A1 | 1/2006 | Oguz et al. |
| 2006/0072676 | A1 | 4/2006 | Gomila |
| 2006/0146940 | A1 | 7/2006 | Gomila et al. |
| 2007/0071100 | A1 | 3/2007 | Shi et al. |
| 2007/0071105 | A1 | 3/2007 | Tian et al. |
| 2007/0076796 | A1 | 4/2007 | Shi et al. |
| 2007/0088971 | A1 | 4/2007 | Walker et al. |

FOREIGN PATENT DOCUMENTS

| | | |
|---|---|---|
| JP | 10032818 A | 2/1998 |
| JP | 10200887 | 7/1998 |
| JP | 1093964 | 10/1998 |
| JP | 2001086504 A | 3/2001 |
| JP | 2001346205 A | 12/2001 |
| JP | 2005528047 A | 9/2005 |
| WO | 03019939 A1 | 3/2003 |
| WO | 2004064406 A1 | 7/2004 |
| WO | WO2004064397 A1 | 7/2004 |
| WO | WO2005076632 A2 | 8/2005 |
| WO | WO2005084035 | 9/2005 |

OTHER PUBLICATIONS

Kordasiewicz R et al., "Hardware Implementation of the Optimized Transforms and Quantization Blocks of H.264", Electrical and Computer Engineering, 2004. Canadian Conference on Niagara Falls, Ont., Canada May 2-5, 2004, Piscataway, NJ, USA, IEEE, US, May 2, 2004, pp. 943-946, vol. 2.

Malvar H S et al., "Low-Complexity Transform and Quantization in H.264/AVC" IEEE Transactions on Circuits and Systems for Video Technology, IEEE Service Center, Pisactaway, NJ, US, vol. 13, No. 7, Jul. 2003, pp. 598-603.

Suh J-W et al., "Error Concealment Based on Directional Interpolation", IEEE Transactions on Consumer Electronics, IEEE Service Center, New York, NY, US, vol. 43, No. 3, Aug. 1, 1997, pp. 295-302.

Le Buhan C, "Software-Embedded Data Retrieval and Error Concealment Scheme for MPEG-2 Video Sequences", Proceedings of the Conference on Digital Video Compression: Algorithms and Technologies 1996, San Jose, CA, USA, Jan. 31-Feb. 2, 1996, vol. 2668, Jan. 31, 1996, pp. 384-391.

Hiroshi Fujiwara et al., "An All-Asic Implementation of a Low Bit-Rate Video Codec", IEEE Transactions on Circuits and Systems for Video Technology, IEEE Service Center, Piscataway, NJ, US, vol. 2, No. 2, Jun. 1, 1992, pp. 123-134.

Wilson Kwok et al., "Multi-Directional Interpolation for Spatial Error Concealment", IEEE Transactions on Consumer Electronics, IEEE Service Center, New York, NY, US, vol. 39, No. 3, Aug. 1, 1993, pp. 455-460.

Wai-Kuen Cham et al., "Integer Sinusoidal Transforms for Image Processing", International Journal of Electronics, Taylor and Francis. Ltd. London, GB, vol. 70, No. 6, Jun. 1, 1991, pp. 1015-1030.

PCT Search Report, Jan. 6, 2007.

Belfiore et al, "Spatiotemporal Error Concealment with Optimized Mode Selection and Appl;ication to H.264", 2003, pp. 907-923.

Shen et al, "Adaptive Motion Vector Resampling for Compressed Video Down-Scaling", 1997, pp. 771-774.

Sullivan et al., "Joint Model Reference Encoding Methods and Decoding Concealment", 2003, pp. 1-35.

Nemethova et al.,"Flexible Error Concealment for H.264 Based on Directional Interpolation", 2005 International Conference on Wireless Networks, Communications and Mobile Computing, IEEE, Jun. 2005, vol. 2, pp. 1255-1260.

Taiwan Search Report—TW095135856—TIPO—May 10, 2011.

* cited by examiner

VIDEO ENCODING METHOD ENABLING HIGHLY EFFICIENT PARTIAL DECODING OF H.264 AND OTHER TRANSFORM CODED INFORMATION

CROSS-REFERENCE TO RELATED APPLICATIONS

Claim of Priority Under 35 U.S.C. §119

The present application for patent claims priority to Provisional Application No. 60/721,377 entitled "ERROR CONCEALMENT" filed Sep. 27, 2005, and assigned to the assignee hereof and hereby expressly incorporated by reference herein.

Claim of Priority Under 35 U.S.C. §120

The present Application for patent is a Continuation in Part of patent application Ser. No. 11/182,621 entitled "METHODS AND APPARATUS FOR SPATIAL ERROR CONCEALMENT" filed Jul. 15, 2005, pending, and assigned to the assignee hereof and hereby expressly incorporated by reference herein.

BACKGROUND

1. Field of the Invention

The invention is directed to multimedia signal processing and, more particularly, to video encoding and decoding.

2. Description of the Related Art

Multimedia signal processing systems, such as video encoders, may encode multimedia data using encoding methods based on international standards such as MPEG-x and H.26x standards. Such encoding methods generally are directed towards compressing the multimedia data for transmission and/or storage. Compression is broadly the process of removing redundancy from the data.

A video signal may be described in terms of a sequence of pictures, which include frames (an entire picture), or fields (e.g., an interlaced video signal comprises fields of alternating odd or even lines of a picture). As used herein, the term "frame" refers to a picture, a frame or a field. Video encoding methods compress video signals by using lossless or lossy compression algorithms to compress each frame. Intra-frame coding (herein referred to as intra-coding) refers to encoding a frame using that frame. Inter-frame coding (herein referred to as inter-coding) refers to encoding a frame based on other, "reference," frames. For example, video signals often exhibit spatial redundancy in which portions of video frame samples near each other in the same frame have at least portions that match or at least approximately match each other.

Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. As used herein, the term "block" refers to either a macroblock or a subblock.

One compression technology based on developing industry standards is commonly referred to as "H.264" video compression. The H.264 technology defines the syntax of an encoded video bitstream together with the method of decoding this bitstream. In one aspect of an H.264 encoding process, an input video frame is presented for encoding. The frame is processed in units of macroblocks corresponding to the original image. Each macroblock can be encoded in intra or inter mode. A predicted macroblock is formed based on portions of an already reconstructed frame or already reconstructed neighboring blocks in the same frame known as causal neighbors. In intra mode, a macroblock is formed from causal samples in the current frame that have been previously encoded, decoded, and reconstructed. Multimedia samples of one or more causal neighboring macroblocks are subtracted from the current macroblock being encoded to produce a residual or difference macroblock, D. This residual block D is transformed using a block transform and quantized to produce X, a set of quantized transform coefficients. These transform coefficients are re-ordered and entropy encoded. The entropy encoded coefficients, together with other information for decoding the macroblock, become part of a compressed bitstream that is transmitted to a receiving device.

Unfortunately, during the transmission process, errors in one or more macroblocks may be introduced. For example, one or more degrading transmission effects, such as signal fading, may cause the loss of data in one or more macroblocks. As a result, error concealment has become critical when delivering multimedia content over error prone networks such as wireless channels. Error concealment schemes make use of the spatial and temporal correlation that exists in the video signal. When errors are encountered, recovery may occur during entropy decoding. For example, when packet errors are encountered, all or part of the data pertaining to one or more macroblocks or video slices (groups of usually neighboring macroblocks) could be lost. When the video data of a slice is lost, resynchronization of decoding can take place at the next slice, and missing blocks of the lost slice can be concealed using spatial concealment.

Since the decoded data available to a decoder device includes the causal neighbors that have already been decoded and reconstructed, spatial concealment typically uses causal neighbors to conceal the missing blocks. One reason for using the causal neighbors to conceal the lost blocks is that out-of-order reconstruction of the next slice followed by concealment of the lost section of the current slice can be very inefficient, especially when using a highly pipelined video hardware decoder core. The non-causal neighbors could offer valuable information for improved spatial concealment. What is needed is an efficient method for providing out of order reconstruction of non-causal neighboring multimedia samples.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Aspects" one will understand how sample features of this invention provide advantages to multimedia encoding and decoding that include improved error concealment, and improved efficiency.

A method of processing multimedia data is provided. The method includes receiving transform coefficients, where the transform coefficients are associated with the multimedia data. The method further includes determining a set of multimedia samples to be reconstructed, determining a set of the received transform coefficients based on the multimedia samples to be reconstructed, and processing the determined set of transform coefficients to generate reconstructed samples corresponding to the determined set of multimedia samples.

A multimedia data processor is provided. The processor is configured to receive transform coefficients, where the transform coefficients are associated with multimedia data. The processor is further configured to determine a set of multimedia samples to be reconstructed, determine a set of the received transform coefficients based on the multimedia samples to be reconstructed, and process the determined set of transform coefficients to generate reconstructed samples corresponding to the determined set of multimedia samples.

An apparatus for processing multimedia data is provided. The apparatus includes a receiver to receive transform coefficients, where the transform coefficients are associated with multimedia data. The apparatus further includes a first determiner to determine a set of multimedia samples to be reconstructed, a second determiner to determine a set of the received transform coefficients based on the multimedia samples to be reconstructed, and a generator to process the determined set of transform coefficients to generate reconstructed samples corresponding to the determined set of multimedia samples.

A machine readable medium including instructions that upon executing cause a machine to process multimedia data is provided. The instructions cause the machine to receive transform coefficients, where the transform coefficients are associated with multimedia data. The instructions further cause the machine to determine a set of multimedia samples to be reconstructed, determine a set of the received transform coefficients based on the multimedia samples to be reconstructed, and process the determined set of transform coefficients to generate reconstructed samples corresponding to the determined set of multimedia samples.

DETAILED DESCRIPTION OF CERTAIN ASPECTS

The following detailed description is directed to certain specific sample aspects of the invention. However, the invention can be embodied in a multitude of different ways as defined and covered by the claims. In this description, reference is made to the drawings wherein like parts are designated with like numerals throughout.

Video signals may be characterized in terms of a series of pictures, frames, or fields. As used herein, the term "frame" is a broad term that may encompass either frames of a progressive video signal or frames or fields of an interlaced video signal.

Aspects include systems and methods of improving processing in an encoder and a decoder in a multimedia transmission system. Multimedia data may include one or more of motion video, audio, still images, or any other suitable type of audio-visual data. Aspects include an apparatus and method of decoding video data in an efficient manor providing improved error concealment by reconstructing non-causal multimedia samples and using the reconstructed samples to perform spatial concealment of lost or erroneous encoded multimedia data. For example, it has been found according to one aspect that generating reconstructed causal and/or non-causal neighboring samples prior to estimating multimedia concealment data for the lost or erroneous data can improve the quality of the spatial concealment. In some examples, the reconstructed multimedia samples and directivity indicators with which the reconstructed samples were originally encoded are used in the estimation of the multimedia concealment data. In another aspect, it has been found that reconstructing a subset of a matrix of multimedia samples to be used in spatial error concealment can further improve the processing efficiency. In some examples the reconstruction of the multimedia samples and the estimation of the multimedia concealment data are performed in a pre-processor. The multimedia concealment data can then be communicated with the originally encoded non-causal multimedia data to be decoded in an efficient video core processor, further improving processing efficiency.

Multimedia Communications System

Figure 1:
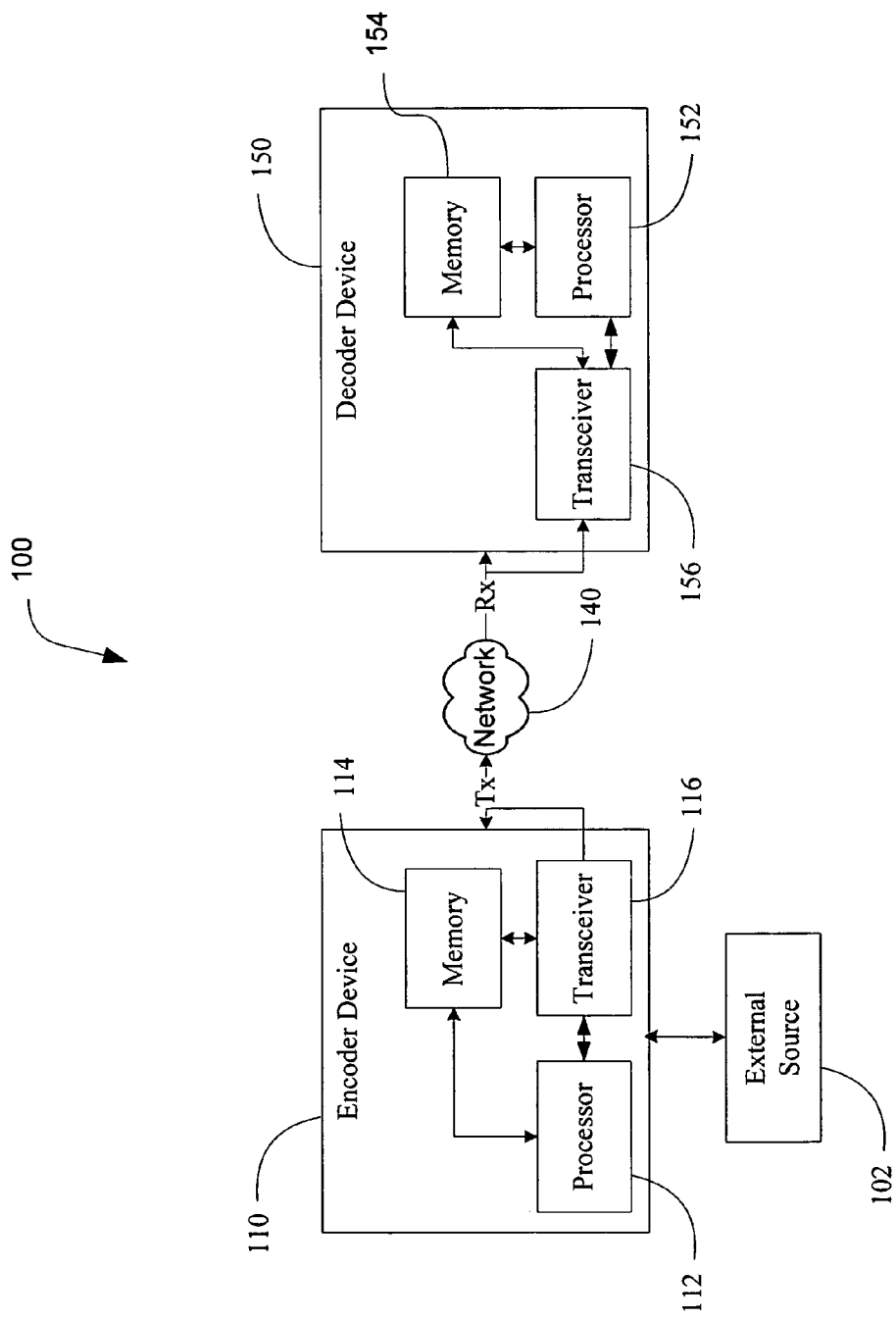
FIG. 1 is a block diagram illustrating a multimedia communications system according to one aspect.

FIG. 1 is a functional block diagram illustrating a multimedia communications system 100 according to one aspect. The system 100 includes an encoder device 110 in communication with a decoder device 150 via a network 140. In one example, the encoder device receives a multimedia signal from an external source 102 and encodes that signal for transmission on the network 140.

In this example, the encoder device 110 comprises a processor 112 coupled to a memory 114 and a transceiver 116. The processor 112 encodes data from the multimedia data source and provides it to the transceiver 116 for communication over the network 140.

In this example, the decoder device 150 comprises a processor 152 coupled to a memory 154 and a transceiver 156. The processor 152 may include one or more of a general purpose processor and/or a digital signal processor and/or an application specific hardware processor. The memory 154 may include one or more of solid state or disk based storage or any readable and writeable random access memory device. The transceiver 156 is configured to receive multimedia data over the network 140 and make it available to the processor 152 for decoding. In one example, the transceiver 156 includes a wireless transceiver. The network 140 may comprise one or more of a wireline or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, an orthogonal frequency division multiple access (OFDM) system, or a DVB-H system.

Figure 2A:
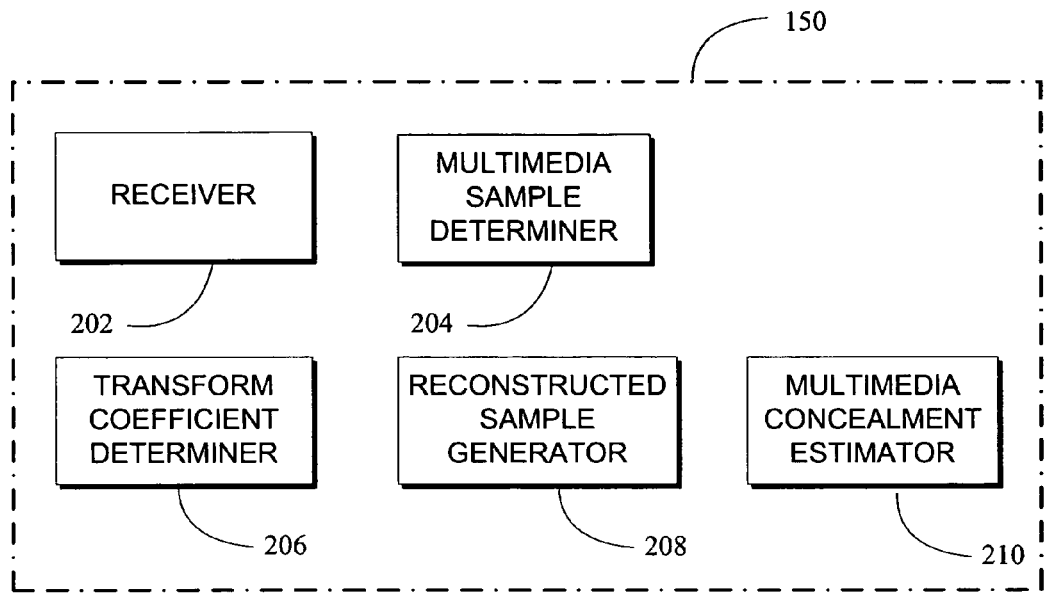
FIG. 2A is a block diagram illustrating an aspect of a decoder device that may be used in a system such as illustrated in FIG. 1.

FIG. 2A is a functional block diagram illustrating an aspect of the decoder device 150 that may be used in a system such as the system 100 illustrated in FIG. 1. In this aspect, the decoder 150 comprises a receiver element 202, a multimedia sample determiner element 204, a transform coefficient determiner element 206, a reconstructed sample generator element 208, and a multimedia concealment estimator element 210.

The receiver 202 receives encoded video data (e.g., data encoded by the encoder 110 of FIG. 1). The receiver 202 may receive the encoded data over a wireline or wireless network such as the network 140 of FIG. 1. In one aspect the received data includes transform coefficients representing source multimedia data. The transform coefficients are transformed into a domain where the correlations of neighboring samples are significantly reduced. For example, images typically exhibit a high degree of spatial correlation in the spatial domain. On the other hand, the transformed coefficients are typically orthogonal to each other, exhibiting zero correlation. Some examples of transforms that can be used for multimedia data include, but are not limited to, the DCT (Discrete Cosine Transform), the DFT (Discrete Fourier Transform), the Hadamard (or Walsh-Hadamard) transform, discrete wavelet transforms, the DST (Discrete Sine Transform), the Haar transform, the Slant transform, the KL (Karhunen-Loeve) transform and integer transforms such as one used in H.264. The transforms are used to transform a matrix or array of multimedia samples. Two dimensional matrices are commonly used, but one dimensional arrays may also be used. The received data also includes information indicating how the encoded blocks were encoded. Such information may include inter-coding reference information such as motion vectors and frame sequence numbers, and intra-coding reference information including block sizes, and spatial prediction directivity indicators, and others. Some received data includes quantization parameters indicating how each transform coefficient was rounded, non-zero indicators indicating how many transform coefficients in the transformed matrix are non-zero, and others.

The multimedia sample determiner 204 determines which multimedia samples are to be reconstructed. In one aspect the multimedia sample determiner 204 determines neighboring multimedia samples or pixels that are near to and/or border regions of multimedia data that are lost and can be concealed. In one example the multimedia sample determiner identifies pixels adjacent to a border of a slice or other group of blocks where a portion of the data has been lost due to errors or channel loss. In some examples, the multimedia sample determiner 204 identifies the fewest number of pixels associated with reconstructing neighboring blocks spatially predicted from the determined pixels. For example, compressed multimedia data can comprise a block of transform coefficients resulting from a transformation of individual blocks (e.g. 8×8 pixel blocks and/or 4×4 pixel blocks) or matrices. The multimedia sample determiner 204 can identify a specific subset of multimedia samples of the transformed block to be reconstructed in order to be used to conceal the lost data or be used to reconstruct other encoded multimedia samples in other blocks predicted from those samples. The determined multimedia samples can include non-causal samples and/or causal samples.

The transform coefficient determiner 206 determines a set of transform coefficients to be used to reconstruct some or all of the multimedia samples determined to be reconstructed by the multimedia sample determiner 204. The determination of which transform coefficients to use depends on the encoding method that was used to generate the transform coefficients. The transform coefficient determination also depends on which multimedia samples are being reconstructed and whether there are transform coefficients with zero values (thereby negating the potential need to use them). Details of which transform coefficients may be sufficient to reconstruct multimedia samples are discussed below.

The reconstructed sample generator 208 reconstructs multimedia samples based on those samples determined by the multimedia sample determiner 204. The set of reconstructed samples can be a whole set, such as an entire N×N matrix of samples, where N is an integer. The set of samples can be a subset of samples from an N×N matrix such as a row, a column, part of a row or column, a diagonal, etc. The reconstructed sample generator 208 uses the transform coefficients determined by the transform coefficient determiner 206 in reconstructing the samples. The reconstructed sample generator 208 also uses information based on the encoding method used to encode the transform coefficients in reconstructing the multimedia samples. Details of actions performed by the reconstructed sample generator 208 are discussed below.

The multimedia concealment estimator 210 uses the reconstructed samples calculated by the reconstructed sample generator 208 to form concealment multimedia samples to replace or conceal regions of multimedia data that are lost or altered with errors during transmission/reception. The multimedia concealment estimator 210 uses reconstructed sample values in one aspect to form the concealment multimedia data. In another aspect the multimedia concealment estimator 210 uses the reconstructed sample values and a received spatial prediction directivity mode indicator in estimating the multimedia concealment data. Further details of spatial error concealment can be found in application Ser. No. 11/182,621 (now published patent application U.S. 2006/0013320) "METHODS AND APPARATUS FOR SPATIAL ERROR CONCEALMENT" which is assigned to the assignee hereof.

In some aspects, one or more of the elements of the decoder 150 of FIG. 2A may be rearranged and/or combined. The elements may be implemented by hardware, software, firmware, middleware, microcode or any combination thereof. Details of the actions performed by the elements of the decoder 150 will be discussed in reference to the methods illustrated in FIGS. 3 and 4 below.

Figure 2B:
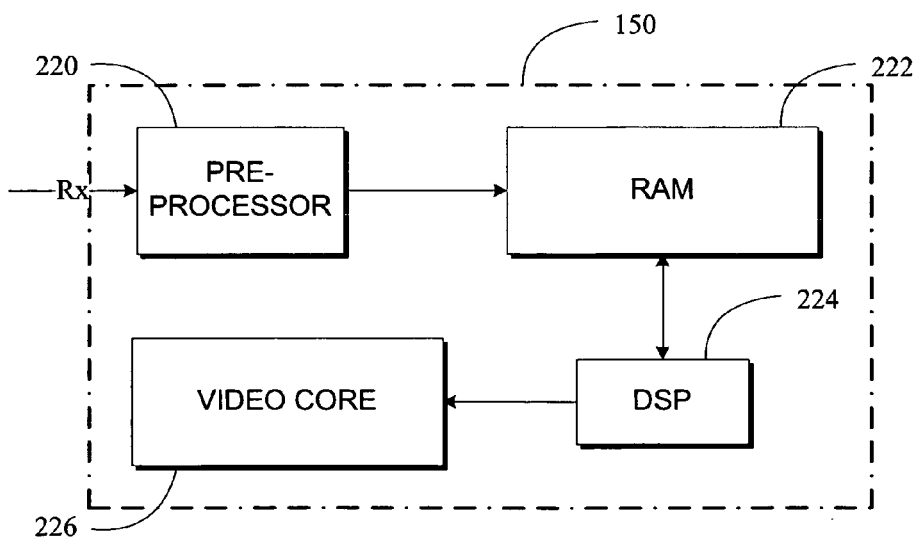
FIG. 2B is a block diagram illustrating an example of a computer processor system of a decoder device that may be used in a system such as illustrated in FIG. 1.

FIG. 2B is a block diagram illustrating an example of a computer processor system of a decoder device that may be used in a system such as illustrated in FIG. 1. The decoder device 150 of this example includes a pre-processor element 220, a random access memory (RAM) element 222, a digital signal processor (DSP) element 224, and a video core element 226.

The pre-processor 220 is used in one aspect to perform one or more of the actions performed by the various elements in FIG. 2A. The pre-processor parses the video bitstream and writes the data to the RAM 222. In addition, in one aspect, the pre-processor 220 implements the actions of the multimedia sample determiner 204, the transform coefficient determiner 206, the reconstructed sample generator 208 and the multimedia concealment estimator 210. By performing these more efficient, less computationally intensive actions in the pre-processor 220, the more computationally intensive video decoding can be done, in causal order, in the highly efficient video core 226.

The DSP 224 retrieves the parsed video data stored in the RAM 222 and reorganizes it to be handled by the video core 226. The video core 226 performs the dequantization (also known as resealing or scaling), inverse transforming and deblocking functions as well as other video decompression functions. The video core is typically implemented in a highly optimized and pipelined fashion. Because of this, the video data can be decoded in the fastest manner when it is decoded in causal order. By performing the out-of-order reconstruction of multimedia samples and the subsequent spatial concealment in the pre-processor, the causal order is maintained for decoding in the video core allowing for improved overall decoding performance.

Figure 3:
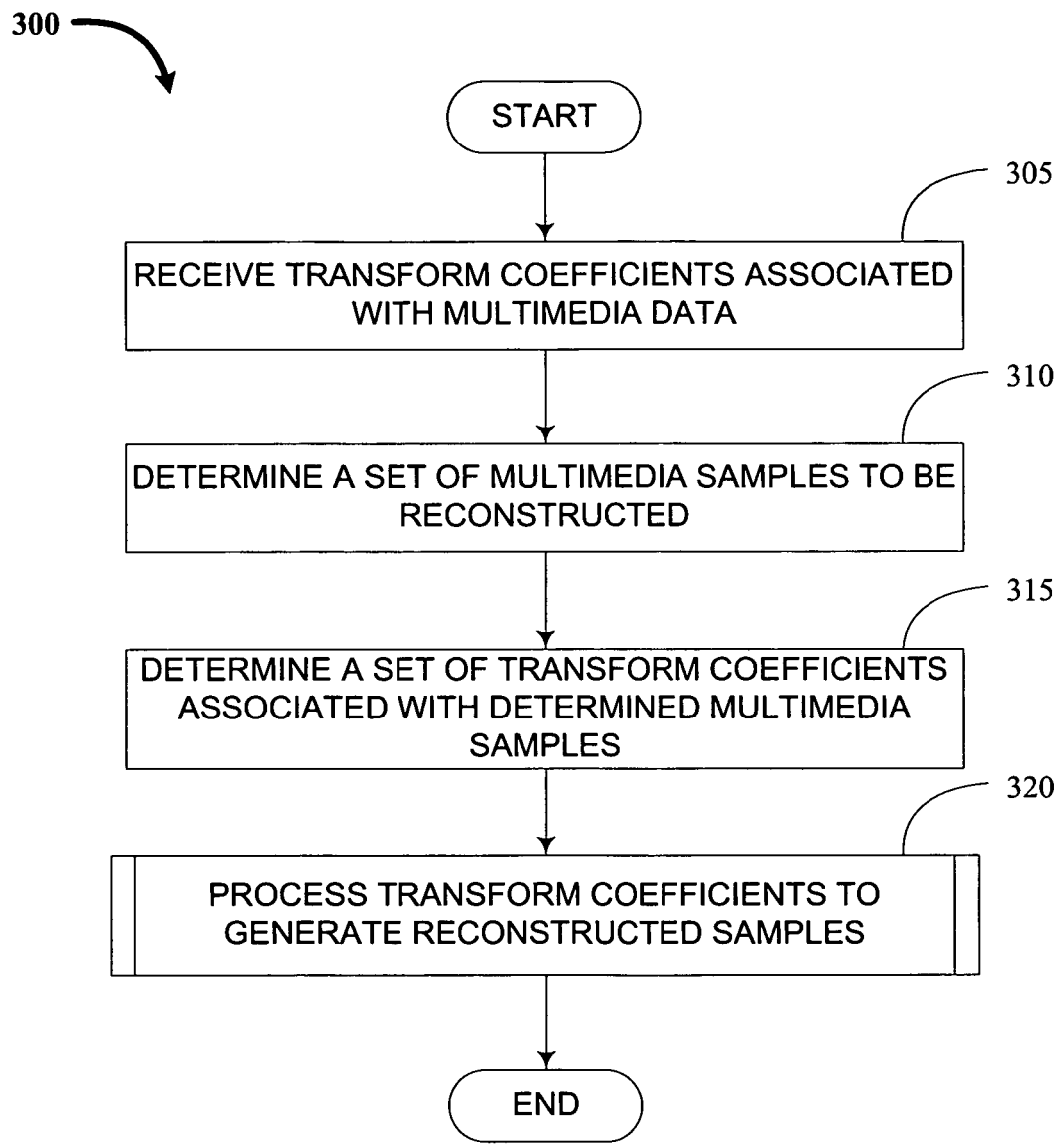
FIG. 3 is a flowchart illustrating one example of a method of decoding a portion of a video stream in a system such as illustrated in FIG. 1.

FIG. 3 is a flowchart illustrating one example of a method of decoding a portion of a video stream in a system such as illustrated in FIG. 1. The process 300 can be performed by a decoding device such as the examples shown in FIGS. 2A and 2B. The process 300 enables reconstruction of selected multimedia samples. The process 300 may be used to reconstruct multimedia samples in a causal order where other encoded multimedia data is predicted from the causal data and may need reconstruction of the causal data prior to its own reconstruction. The process 300 may be used to reconstruct multimedia samples in non-causal order. In one aspect, the non-causal data is reconstructed in a manner so as to permit a subsequent reconstruction of all the multimedia data (both causal and non-causal) in a more efficient and timely manner.

The process 300 starts at block 305 where the decoder device receives transform coefficients associated with a multimedia data bitstream. The decoder device may receive the transform coefficients over a wireline and/or wireless network such as the network 140 shown in FIG. 1. The transform coefficients can represent multimedia samples including color and/or brightness parameters such as chrominance and luminance, respectively. The transforms used to generate the transform coefficients may include, but are not limited to, the DCT (Discrete Cosine Transform), the DFT (Discrete Fourier Transform), the Hadamard (or Walsh-Hadamard) transform, discrete wavelet transforms, the DST (Discrete Sine Transform), the Haar transform, the Slant transform, the KL (Karhunen-Loeve) transform and integer transforms such as one used in H.264. The multimedia samples may be transformed in groups such as one dimensional arrays and/or two dimensional matrices when the transform coefficients are generated during encoding. The transformed coefficients may be intra-coded and may or may not include spatial prediction. In the cases where spatial prediction was used in generating the transform coefficients, the transform coefficients may represent a residual value that is the error of a predictor provided by a reference value. The transform coefficients may be quantized. The transform coefficients may be entropy encoded. The receiver element 202 of FIG. 2A may perform the acts at block 305.

After receiving the transform coefficients, the process 300 continues at block 310 where the decoder device determines a set of multimedia samples to be reconstructed. The multimedia samples to be reconstructed may include luminance (luma) and chrominance (chroma) samples. In some examples, the set of multimedia samples to be reconstructed are determined in response to loss of synchronization while decoding the multimedia bitstream being received at block 305. The loss of synchronization may be caused by the erroneous reception or the loss of some or all of the encoded data corresponding to multimedia samples contained in a first slice of macroblocks. The determined multimedia samples to be reconstructed may be contained in a second slice of macroblocks. The second slice of macroblocks borders at least a part of the lost portion of the first slice of macroblocks. The determined multimedia samples may be causal or non-causal with respect to the lost portion of multimedia samples, as discussed above.

In one aspect, the multimedia samples determined to be reconstructed at block 310 may enable reconstruction of other multimedia samples that border a lost portion of multimedia data to be concealed. For example, intra-coded macroblocks at the bottom of another slice of macroblocks may be spatially predicted in reference to the determined set of multimedia samples determined to be reconstructed at block 310. Therefore, by reconstructing the determined set of multimedia samples which strongly correlate with the intra-coded blocks, the intra-coded blocks themselves can be reconstructed through a concealment process. In another aspect, the multimedia samples determined to be reconstructed at block 310 may comprise samples located on or near a slice border. The samples to be reconstructed may comprise an entire matrix of associated multimedia samples that were transformed as a group during encoding. The samples to be reconstructed may also comprise a portion of the matrix of associated multimedia samples such as a row, a column, a diagonal, or portions and/or combinations thereof. The multimedia sample determiner 204 of FIG. 2A may perform the acts at block 310. Details of subsets of multimedia samples that may be reconstructed are discussed below.

The process 300 continues at block 315 where the decoder device determines a set of transform coefficients associated with the multimedia samples determined to be reconstructed at block 310. The determination of which transform coefficients to use for reconstruction depends on the encoding method that was used to generate the transform coefficients. The transform coefficient determination also depends on which multimedia samples are being reconstructed. For example, it may be determined that the entire set of multimedia samples determined at block 310 may be reconstructed, or a subset may alternatively be determined to be reconstructed. The transform coefficient determination at block 315 also depends on whether there are transform coefficients with zero value (thereby negating the potential need to use them). Details of which transform coefficients may be sufficient to reconstruct multimedia samples are discussed below. The transform coefficient determiner of FIG. 2A can perform the acts at block 315.

After determining the set of multimedia samples to be reconstructed at block 310, and determining the set of transform coefficients associated with the determined multimedia samples at block 315, the process 300 proceeds to block 320. At block 320, the decoder device processes the set of determined transform coefficients in order to generate reconstructed multimedia samples. The processing performed depends on the encoding methods that were used to generate the transform coefficients. The processing includes inverse transforming the transform coefficients, but may also include other acts including, but not limited to, entropy decoding, dequantization (also called rescaling or scaling), etc. Details of examples of processing performed at block 320 are discussed below in reference to FIG. 4.

In some example systems, some or all acts of the process 300 are performed in a pre-processor such as the pre-processor 220 shown in FIG. 2B. It should be noted that some of the blocks of the process 300 may be combined, omitted, rearranged or any combination thereof.

Figure 4:
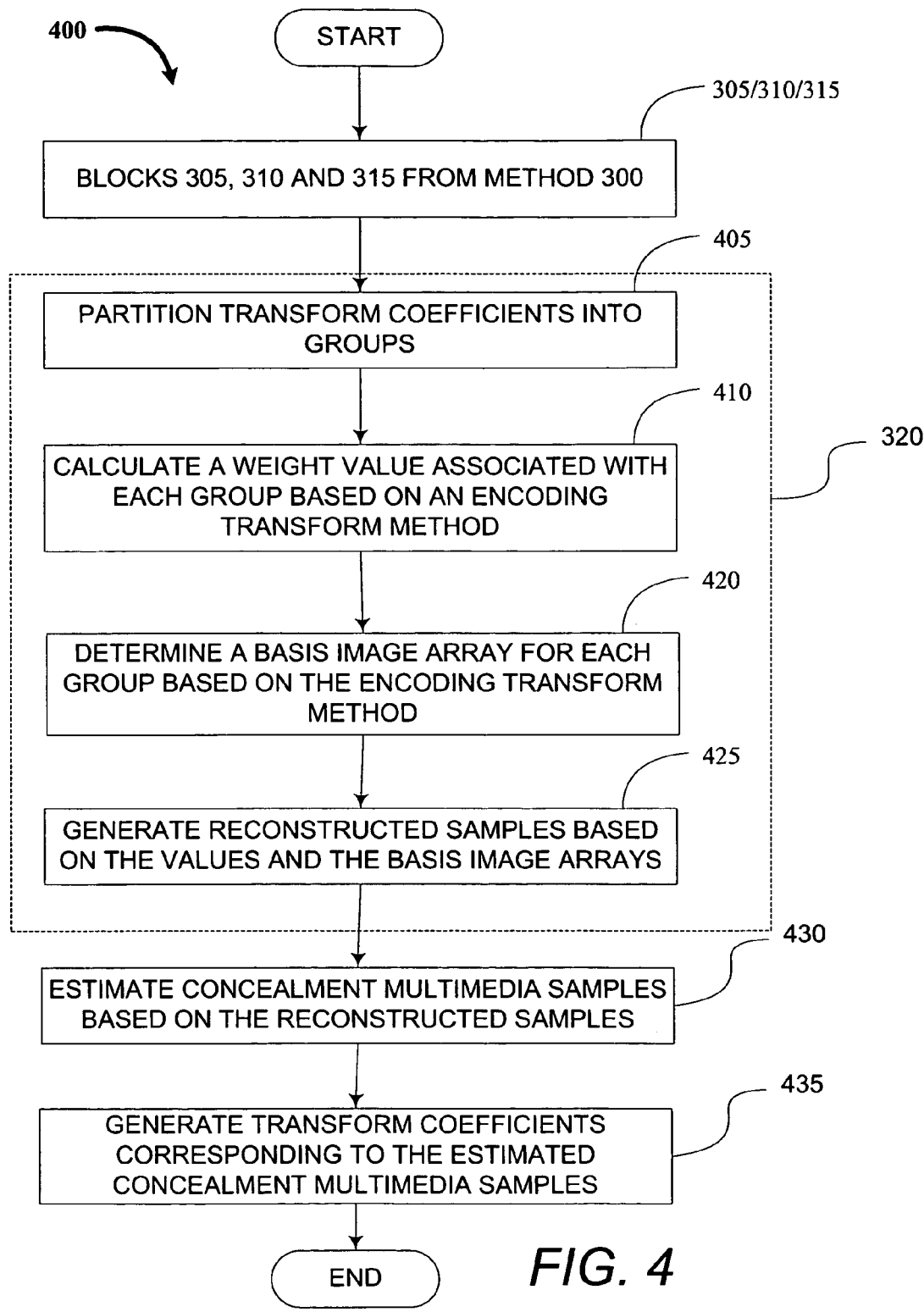
FIG. 4 is a flowchart illustrating in more detail another example of a method of decoding a portion of a video stream in a system such as illustrated in FIG. 1.

FIG. 4 is a flowchart illustrating in more detail another example of a method of decoding a portion of a video stream in a system such as illustrated in FIG. 1. The example process 400 includes all of the actions performed at the blocks 305 to 320 contained in the process 300. The blocks 305, 310 and 315 remain unchanged from the examples shown in FIG. 3 and discussed above. The block 320 of the process 300, where the transform coefficients are processed to generate reconstructed samples, is illustrated in more detail in the process 400, where it comprises four blocks 405, 410, 420 and 425. The process 400 also includes additional blocks where concealment multimedia samples are estimated, block 430, and where transform coefficients, based on the estimated concealment multimedia samples, are generated, block 435.

The decoder device performs the actions at blocks 305, 310 and 315 in a similar fashion as discussed above. The detailed example of the block 320 is shown where transform coefficients are associated with basis images in order to efficiently reconstruct the multimedia samples. At block 405, the decoder device partitions the transform coefficients into groups, where the groups of transform coefficients are associated with the multimedia samples determined to be reconstructed at block 305. In one aspect, the groups of transform coefficients comprise the transform coefficients that modify (or weigh) a common basis image during an inverse transformation process in the reconstruction. Details of how transform coefficients are partitioned into groups are discussed below in relation to an example using H.264.

At block 410, the decoder device calculates a weight value associated with each partitioned group based on the encoding method which generated the coefficients. In one aspect, the weight is the sum of scaled transform coefficients of each group. The scaling duplicates the inverse transform characteristics of the encoding method. Examples of scaling and calculating the weight value are discussed below in relation to the H.264 example.

At block 420, basis images are determined for each of the groups based on the encoding transform method. Basis images are typically two dimensional orthogonal matrices, although one-dimensional arrays may also be utilized. Portions of the two dimensional basis images are used, where the portions depend on which multimedia samples are being reconstructed (as determined at block 310). The values calculated for each group at block 410 are use to modify (or weigh) the associated basis images at block 425. By combining all the weighed basis images, multimedia samples are reconstructed at block 425. Details of blocks 420 and 425 are discussed below in reference to the H.264 example.

After generating the reconstructed multimedia samples, the process 400 continues at block 430, where the decoder device estimates concealment multimedia samples, in some examples, based on the reconstructed samples. In one aspect, reconstructed sample values of the multimedia samples are used to form the concealment multimedia data. In another aspect the reconstructed sample values and a received spatial prediction directivity mode indicator are used to form the multimedia concealment data. Further details of spatial error concealment can be found in the application Ser. No. 11/182/621 (now published patent application U.S. 2006/0013320) "METHODS AND APPARATUS FOR SPATIAL ERROR CONCEALMENT" which is assigned to the assignee hereof.

In some examples, the estimated concealment multimedia samples are used directly and inserted into a frame buffer containing reconstructed data of the same frame to then be displayed. In other examples, the estimated concealment multimedia samples are transformed, in a manner replicating an encoding process, to generate transform coefficients representing the estimated concealment multimedia samples at block 435. These transformed coefficients are then inserted into the undecoded (still encoded) bitstream as if they were normal encoded samples. The entire bitstream can then be forwarded to a video decoder core, such as the video core 226 in FIG. 2B, to be decoded. In these examples, all or part of the process 400 can be performed in a pre-processor such as the pre-processor 220 of FIG. 2B. This method of performing the reconstruction and concealment estimation is especially useful for reconstructing non-causal portions which are then used to conceal other portions of multimedia data that were lost due to channel errors. Details of methods used to improve the efficiency of the reconstruction of multimedia samples will now be discussed in relation to H.264 encoded multimedia bitstreams.

High-Efficiency Partial Intra Decoding in H.264 Bitstreams

H.264 uses spatial prediction to exploit the spatial correlation among neighboring blocks of pixels. The spatial prediction modes use the causal neighbors to the left and above a 4×4, 8×8 or 16×16 pixel block for spatial prediction. H.264 offers 2 modes of spatial prediction for Luma values, one for 4×4 pixel blocks (herein referred to as intra-4×4 coding) and one for 16×16 pixel macroblocks (herein referred to as intra-16×16 coding). Note that other causal and non-causal neighboring samples may be used for spatial prediction.

Figure 5:
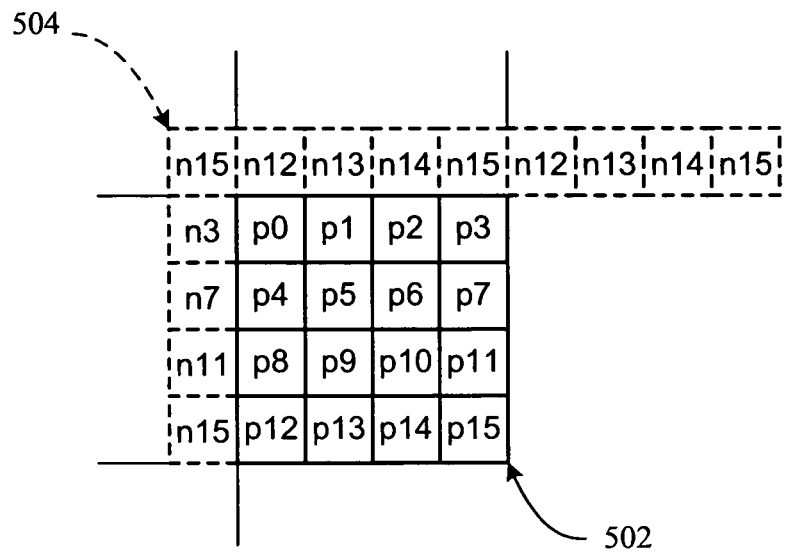
FIG. 5 shows a detailed diagram of a 4×4 block and its surrounding causal neighbor pixels.

FIG. 5 shows a detailed diagram of a 4×4 pixel block 502 and its surrounding causal neighbor pixels to the left and above, shown generally as 504. For example, during the H.264 encoding process, the causal neighbor pixels 504 are used to generate various predictors, values and/or parameters describing the block 502 pixels. The block 502 comprises pixels (p0-p15) and the causal neighbor pixels 504 are identified using reference indicators n3, n7, n11, n12, n13, n14, and n15 where the number corresponds to the similar positions of the block 502 pixels.

Figure 6:
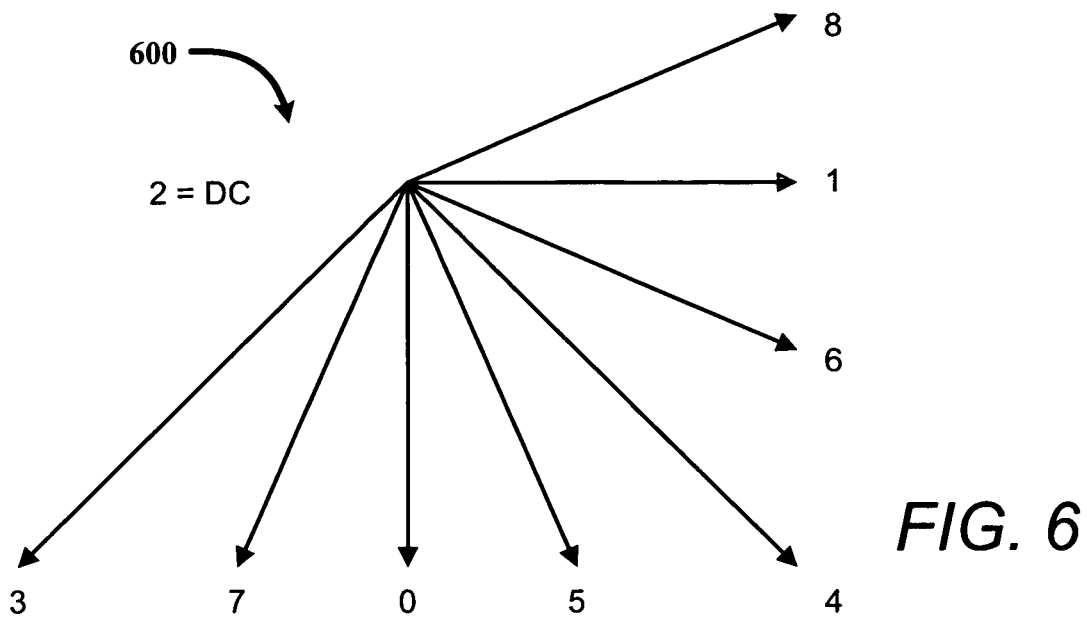
FIG. 6 shows a directivity mode diagram that illustrates nine directivity modes (0-8) which are used to describe a directivity characteristic of a block in H.264.

The spatial prediction modes provided in H.264 use various directivity modes to spatially predict the block 502 from the various causal neighbor pixels 504. FIG. 6 shows a directivity mode diagram 600 that illustrates nine directivity modes (0-8) which are used to describe a directivity characteristic of an intra-coded block in H.264. The nine directivity modes (or indicators) are used to describe a directivity characteristic of the spatial prediction of block 502. For example, mode 0 describes a vertical directivity characteristic, mode 1 describes a horizontal directivity characteristic, and mode 2 describes a DC characteristic where the average value of available causal neighboring pixels is used as a reference for the prediction. In the DC mode, the causal neighboring pixels (those immediately above and to the left of the 4×4, 8×8 or 16×16 pixel block) that are in the same slice are used in calculating the average. For example, if the block being encoded borders a slice above, then the pixels to the left are averaged. If the block being encoded borders another slice to the left and above, then a value of 128 is used as the DC average (half of the 8-bit range of values provided in H.264). The modes illustrated in the directivity mode diagram 600 are used in the H.264 encoding process to generate prediction values for the block 502.

In intra-4×4 coding of H.264, the luma values can be encoded in reference to the pixels to the left and above the 4×4 block using any of the nine directivity modes. In intra-16×16 coding, the luma values can be encoded in reference to the pixels to the left and above the entire 16×16 pixel block using four modes: i) vertical (mode 0), ii) horizontal (mode 1), iii) DC (mode 2), and iv) planar (mode 3). In the planar prediction mode, it is assumed that the luma values vary spatially and smoothly across the macroblock and the reference is formed based on a planar equation. For chroma, there is one prediction mode, 8×8. In the intra-8×8 chroma coding, the 8×8 block can be predicted with the same modes used in intra-16×16 coding: i) vertical (mode 0), ii) horizontal (mode 1), iii) DC (mode 2), and iv) planar (mode 3). Details of reconstructing the predicted blocks encoded in H.264 will now be discussed.

The reconstructed signal within a predictive (intra or inter) coded 4×4 (luma or chroma) block can be expressed as:

$$r = p + \tilde{\Delta} \quad (1)$$

where r, p and $\tilde{\Delta}$, respectively denote the reconstructed signal (an approximation to the original uncompressed signal s), the prediction signal, and the compressed residual signal (an approximation to the original uncompressed residual signal: $\Delta = s - p$, where s is the original signal), all of which are integer valued 4×4 matrices in this example. The residual values $\tilde{\Delta}$ can be reconstructed by inverse transformation of the transform coefficients. The prediction values p are obtained from causal neighboring pixels depending on the spatial prediction mode used to encode them.

Figure 9:
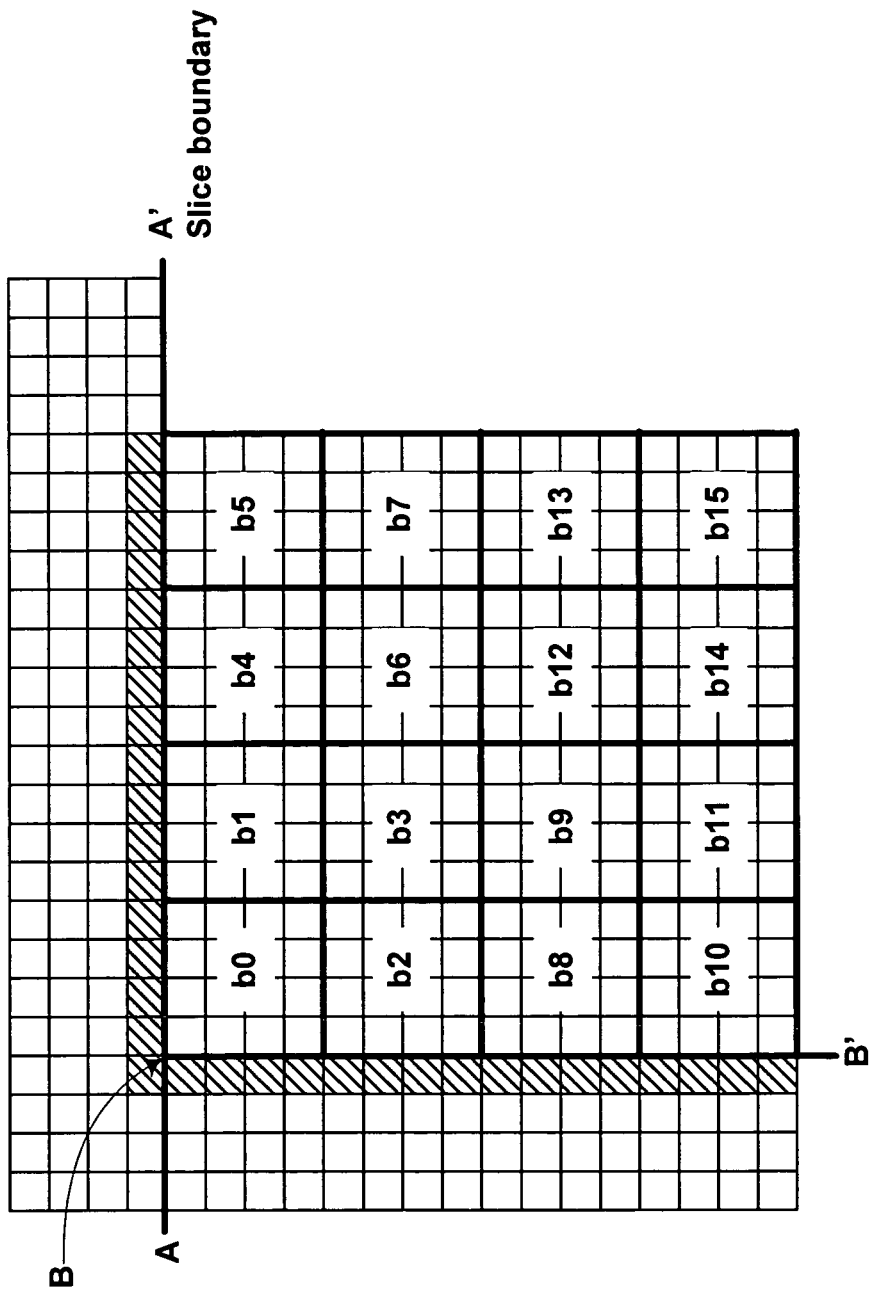
FIG. 9 illustrates one example of an intra-coded 16×16 Luma macroblock immediately below and right of a slice boundary.

The following are observations affecting reconstruction of pixels within intra-4×4 coded macroblocks located immediately below a slice boundary (non-causal neighbors in H.264). In a 16×16 macroblock, these blocks include the uppermost four 4×4 blocks located immediately below a slice boundary. For example, the blocks with indices b0, b1, b4 and b5 in the 16×16 pixel macroblock shown in FIG. 9 are representative of blocks immediately below a slice boundary AA'.

Figures 7, 8:
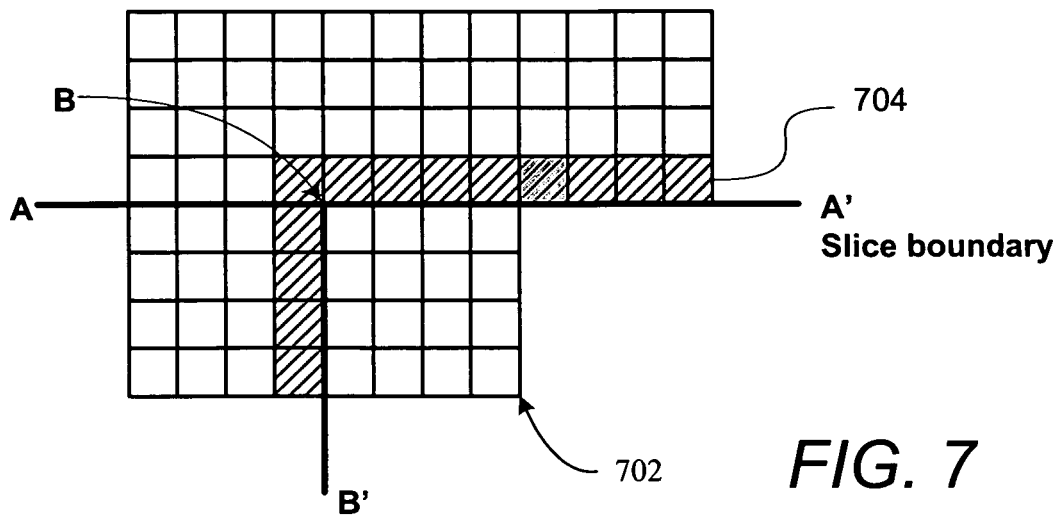
FIG. 7 illustrates one example of an intra-coded 4×4 pixel block immediately below and right of one or more slice boundaries.
FIG. 8 illustrates a nomenclature of neighbor pixels and pixels within an intra-coded 4×4 pixel block.

FIG. 7 shows one aspect of an intra-4×4 coded block immediately below a slice boundary. The line AA' marks the mentioned slice boundary and the 4×4 block 702 is the current block being reconstructed. The 9 neighboring pixels 704 above the slice boundary line AA' which could normally have been used for performing spatial prediction in the intra-4×4 coding, are not available since they are located on the other side of the slice boundary and hence they belong to another slice. Spatial prediction as well as any other predictive coding dependency across a slice boundary is not permitted in H.264 since slices act as resynchronization points.

FIG. 8 illustrates a nomenclature for the neighbor pixels and pixels within an intra-4×4 coded block. Since pixels above the slice boundary AA' are not available for spatial prediction, the neighboring pixels of block 702 available for prediction are the pixels {I, J, K, L}. This implies that the permissible intra-4×4 coding prediction modes for the 4×4 block 702 are: i) mode 1 (horizontal), ii) mode 2 (DC), and iii) mode 8 (horizontal-up). If the line BB' in FIG. 7 marked another slice boundary, then none of the pixels {I, J, K, L} or {M, A, B, C, D, E, F, G and H} would be available for spatial prediction. In this case, the permissible intra-4×4 coding prediction mode available is mode 2 (DC) where the reference value for all the pixels of block 702 is 128.

Thus, in the most general case, the information for decoding and reconstructing some or all of the pixels of an intra-4×4 coded block located immediately below a slice boundary includes:
1. the intra-4×4 prediction mode indicator;
2. the residual information (quantized transform coefficients); and
3. the values of the 4 neighboring pixels {I, J, K, L in FIG. 8} located immediately to the left of the 4×4 block.

This sufficient data set can enable the reconstruction of all pixel values {a, b, c, . . . , n, o, p in FIG. 8} of the current 4×4 block. In addition, this data set is sufficient for reconstructing the values of the pixel subset {d, h, l, p} which in turn may be used for the reconstruction of the next 4×4 block immediately to the right.

The following are observations affecting reconstruction of pixels within intra-16×16 coded macroblocks located immediately below a slice boundary (non-causal neighbors in H.264). Here again, the interest is in the uppermost four 4×4 blocks (i.e. those with block indices b0, b1, b4, and b5 in FIG. 9), of an intra-16×16 coded macroblock located immediately below a slice boundary.

FIG. 9 shows one aspect of an intra-16×16 coded macroblock located below a slice boundary. The line AA' marks the mentioned slice boundary and the four 4×4 blocks labeled b0, b1, b4 and b5 constitute the portion of the 16×16 macroblock under consideration for reconstruction. The 17 neighboring pixels above the line AA', which could normally have been used for performing the intra-16×16 spatial prediction, are not available since they are located on the other side of the slice boundary and hence they belong to another slice. The potential availability of 16 neighboring pixels, those located immediately to the left of line BB' in this example, implies that the permissible intra-16×16 coding spatial prediction modes for the current macroblock are i) mode 1 (horizontal), and ii) mode 2 (DC). When neither the 16 neighboring pixels located immediately to the left of line BB', nor the 17 pixels located above the line AA' are available, which would, for example, be the case if line BB' marks another slice boundary (or the left boundary of the video frame), the permissible intra-16×16 prediction mode is mode 2 (DC).

When the current macroblock is encoded using the Intra-16×16 prediction mode 1 (horizontal), then the topmost four neighboring pixels located immediately to the left of line BB' and below the line AA' are sufficient for decoding and reconstructing the topmost four 4×4 blocks within the current 16×16 macroblock. This is consistent with the above described framework enabling the decoding of the topmost four 4×4 blocks in intra-4×4 coded macroblocks.

However, when the current macroblock is encoded using the Intra-16×16 spatial prediction mode 2 (DC), and it is not immediately to the right of a slice boundary nor on the left frame boundary, then all 16 neighboring pixels located immediately to the left of line BB' are used for decoding and reconstructing the topmost four 4×4 blocks within the current MB (as well as all others in the row). This is an undesirable situation. In one aspect, it is beneficial to avoid encoding with the intra-16×16 spatial prediction mode 2 (DC) immediately below a slice boundary. It is desirable that the topmost 4 neighboring pixels may be used for reconstruction of the pixels below a slice boundary (e.g., the pixels I, J, K and L in FIG. 8).

In one aspect, the intra-16×16 coding of macroblocks which are located immediately below a slice boundary should be limited to the spatial prediction mode 1 (horizontal), unless they are located immediately to the right of a slice boundary, or at the left frame boundary. This allows for computationally efficient reconstruction of the rightmost four pixels of all the topmost 4×4 blocks in the row. This in turn allows for computationally efficient reconstruction of the topmost four pixels of all the topmost 4×4 blocks in the row.

Figure 10:
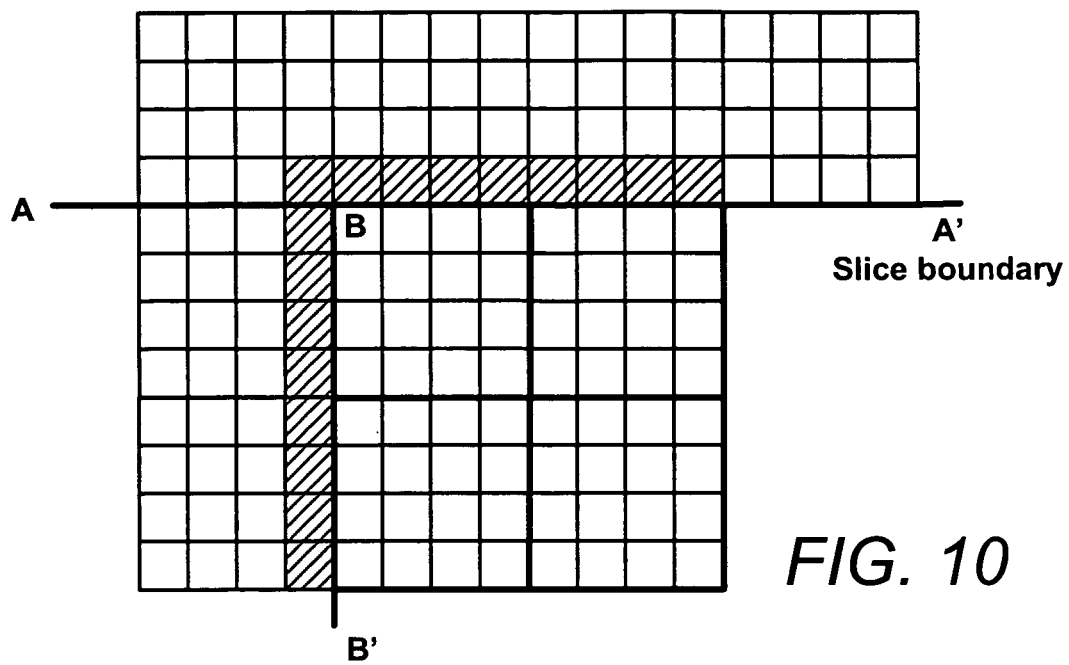
FIG. 10 illustrates one example of an intra-coded 8×8 Chroma block immediately below and right of a slice boundary.

FIG. 10 shows one aspect of a 8×8 chroma block located immediately below a slice boundary. The line AA' marks the slice boundary and the two 4×4 blocks immediately below line AA' and to the right of line BB' constitute data for one of the two chroma channels (Cr and Cb). The nine neighboring pixels above the slice boundary line AA' are not available for spatial prediction, in this example, since they are located on the other side of the slice boundary and hence they belong to another slice. The availability of 8 neighboring pixels, those located immediately to the left of line BB', implies that the permissible chroma channel intra prediction modes for the current MB are limited to i) mode 0 (DC) and ii) mode 1 (horizontal). When the line BB' is also a slice boundary or the left boundary of the video frame, neither the 8 neighboring pixels located immediately to the left of line BB', nor the 9 pixels located immediately above the line AA' are available for spatial prediction. In this case, the permissible chroma channel intra prediction mode is mode 0 (DC).

When the current intra coded macroblock's chroma channels are encoded using the Intra-8×8 chroma horizontal prediction mode, the topmost four neighboring pixels located immediately to the left of line BB' may be needed for decoding and reconstructing the topmost two 4×4 chroma blocks within the current MB. It should be noted that there are two 8×8 chroma blocks corresponding to one 16×16 luma macroblock.

Likewise, when the current intra-coded macroblock chroma channels (Cr and Cb) are encoded using the Intra-8×8 chroma prediction mode 2 (DC), the availability of the 8 neighboring pixels located immediately to the left of line BB' is adequate for decoding and reconstructing the topmost two 4×4 blocks. This is again consistent with the above described framework.

In one aspect, the intra-8×8 coding of chroma channels (Cr and Cb) of intra-coded macroblocks, which are located immediately below a slice boundary, should be limited to the spatial prediction mode 1 (horizontal), unless they are located immediately to the right of a slice boundary, or at the left frame boundary. This allows for computationally efficient reconstruction of the rightmost four pixels of all the topmost 4×4 blocks in the row. This in turn allows for computationally efficient reconstruction of the topmost four pixels of all the topmost 4×4 blocks in the row. This is consistent with the above described framework enabling the decoding of the topmost four 4×4 blocks in intra-coded macroblocks luma channels (both intra-4×4 coded macroblocks, and intra-16×16 coded macroblocks with the limitations placed on the use of intra-16×16 DC spatial prediction mode as discussed above.)

Efficient Partial Decoding of Intra-coded Samples in H.264

It has been shown that partial decoding of the four rightmost pixels of 4×4 pixel blocks allows for decoding of some and/or all of the pixels of intra-coded blocks to the right of the initial 4×4 block. The problem of efficiently decoding the fourth i.e. the last, column of the residual component of a 4×4 intra-coded block contributing to the reconstruction of final pixel values for positions {d, h, 1, p} in FIG. 8, will now be addressed. This example uses the basis images of the H.264 integer transform. However, it should be noted that basis images of other transforms could be manipulated in similar ways, allowing for similar efficient partial decoding. Other transforms that may be partially decoded using these methods include, but are not limited to, the DCT (Discrete Cosine Transform), the DFT (Discrete Fourier Transform), the Hadamard (or Walsh-Hadamard) transform, discrete wavelet transforms, the DST (Discrete Sine Transform), the Haar transform, the Slant transform, and the KL (Karhunen-Loeve) transform.

In general, a forward transformation of an N×N matrix [Y] of multimedia samples using a transformation matrix [T] resulting in a transform coefficient matrix [w] takes the form:

$$[w]=[T]^T[Y][T] \tag{3}$$

The corresponding inverse transformation to reconstruct the multimedia sample matrix [Y] is of the form:

$$[Y]=[T][w][T]^T \tag{4}$$

The transformations represented by equations (3) and (4) can each be thought of as two one-dimensional (1D) transforms resulting in a two-dimensional (2D) transform. For example, the [Y] [T] matrix multiplication operation can be thought of as a 1D row transform and the $[T]^T[Y]$ matrix multiplication operation can be thought of as a 1D column transform. The combination forms a 2D transform. Another way of thinking about the 2D transform of an N×N matrix [Y] is to perform $N^2$ inner-products of [Y] with 2D basis images corresponding to the 2D transform characterized by the transform matrix [T], leading to a set of $N^2$ values identical to the set of transform coefficients.

Basis images of a given transform [T] can be calculated by setting one of the transform coefficients to one and setting all others to zero, and taking an inverse transform of the resulting coefficient matrix. For example, using a 4×4 transform coefficient matrix [w], and setting the $w_{11}$ coefficient to 1 and all others to zero, and using the H.264 integer transform $[T_H]$, equation (4) results in:

$$[Y] = [T_H]\begin{bmatrix}1 & 0 & 0 & 0\\0 & 0 & 0 & 0\\0 & 0 & 0 & 0\\0 & 0 & 0 & 0\end{bmatrix}[T_H]^T = \begin{bmatrix}1 & 1 & 1 & 1\\1 & 1 & 1 & 1\\1 & 1 & 1 & 1\\1 & 1 & 1 & 1\end{bmatrix}; \tag{5}$$

By summing the 16 ($N^2$ where N=4) matrices formed by using the individual transform coefficients (weights) in [w] to weigh (scale) the 16 ($N^2$) basis images, the entire reconstructed matrix [Y] can be calculated. This is not an efficient method compared to fast transform methods for calculating the entire matrix. However, reconstructing a subset, such as a row or column, can be done more efficiently than a fast transform through using basis images.

The 16 basis images associated with the H.264 4×4 integer transformation process for residual 4×4 blocks can be determined to be as follows, where sij (for i,j ∈ {0, 1, 2, 3}) is the basis image associated with the horizontal and jth vertical frequency channel.

$$s00 = \begin{bmatrix}1 & 1 & 1 & 1\\1 & 1 & 1 & 1\\1 & 1 & 1 & 1\\1 & 1 & 1 & 1\end{bmatrix}; \tag{6a}$$

$$s10 = \begin{bmatrix}1 & 0.5 & -0.5 & -1\\1 & 0.5 & -0.5 & -1\\1 & 0.5 & -0.5 & -1\\1 & 0.5 & -0.5 & -1\end{bmatrix}; \tag{6b}$$

-continued $$s20 = \begin{bmatrix} 1 & -1 & -1 & 1 \\ 1 & -1 & -1 & 1 \\ 1 & -1 & -1 & 1 \\ 1 & -1 & -1 & 1 \end{bmatrix};$$ (6c)

$$s30 = \begin{bmatrix} 0.5 & -1 & 1 & -0.5 \\ 0.5 & -1 & 1 & -0.5 \\ 0.5 & -1 & 1 & -0.5 \\ 0.5 & -1 & 1 & -0.5 \end{bmatrix};$$ (6d)

$$s01 = \begin{bmatrix} 1 & 1 & 1 & 1 \\ 0.5 & 0.5 & 0.5 & 0.5 \\ -0.5 & -0.5 & -0.5 & -0.5 \\ -1 & -1 & -1 & -1 \end{bmatrix};$$ (6e)

$$s11 = \begin{bmatrix} 1 & 0.5 & -0.5 & -1 \\ 0.5 & 0.25 & -0.25 & -0.5 \\ -0.5 & -0.25 & 0.25 & 0.5 \\ -1 & -0.5 & 0.5 & 1 \end{bmatrix};$$ (6f)

$$s21 = \begin{bmatrix} 1 & -1 & -1 & 1 \\ 0.5 & -0.5 & -0.5 & 0.5 \\ -0.5 & 0.5 & 0.5 & -0.5 \\ -1 & 1 & 1 & -1 \end{bmatrix};$$ (6g)

$$s31 = \begin{bmatrix} 0.5 & -1 & 1 & -0.5 \\ 0.25 & -0.5 & 0.5 & -0.25 \\ -0.25 & 0.5 & -0.5 & 0.25 \\ -0.5 & 1 & -1 & 0.5 \end{bmatrix};$$ (6h)

$$s02 = \begin{bmatrix} 1 & 1 & 1 & 1 \\ -1 & -1 & -1 & -1 \\ -1 & -1 & -1 & -1 \\ 1 & 1 & 1 & 1 \end{bmatrix};$$ (6i)

$$s12 = \begin{bmatrix} 1 & 0.5 & -0.5 & -1 \\ -1 & -0.5 & 0.5 & 1 \\ -1 & -0.5 & 0.5 & 1 \\ 1 & 0.5 & -0.5 & -1 \end{bmatrix};$$ (6j)

$$s22 = \begin{bmatrix} 1 & -1 & -1 & 1 \\ -1 & 1 & 1 & -1 \\ -1 & 1 & 1 & -1 \\ 1 & -1 & -1 & 1 \end{bmatrix};$$ (6k)

$$s32 = \begin{bmatrix} 0.5 & -1 & 1 & -0.5 \\ -0.5 & 1 & -1 & 0.5 \\ -0.5 & 1 & -1 & 0.5 \\ 0.5 & -1 & 1 & -0.5 \end{bmatrix};$$ (6l)

$$s03 = \begin{bmatrix} 0.5 & 0.5 & 0.5 & 0.5 \\ -1 & -1 & -1 & -1 \\ 1 & 1 & 1 & 1 \\ -0.5 & -0.5 & -0.5 & -0.5 \end{bmatrix};$$ (6m)

$$s13 = \begin{bmatrix} 0.5 & 0.25 & -0.25 & -0.5 \\ -1 & -0.5 & 0.5 & 1 \\ 1 & 0.5 & -0.5 & -1 \\ -0.5 & -0.25 & 0.25 & 0.5 \end{bmatrix};$$ (6n)

$$s23 = \begin{bmatrix} 0.5 & -0.5 & -0.5 & 0.5 \\ -1 & 1 & 1 & -1 \\ 1 & -1 & -1 & 1 \\ -0.5 & 0.5 & 0.5 & -0.5 \end{bmatrix};$$ (6o)

$$s33 = \begin{bmatrix} 0.25 & -0.5 & 0.5 & -0.25 \\ -0.5 & 1 & -1 & 0.5 \\ 0.5 & -1 & 1 & -0.5 \\ -0.25 & 0.5 & -0.5 & 0.25 \end{bmatrix};$$ (6p)

A careful look at these 16 basis images reveals that their last columns actually contain four distinct vectors, except for scale factors. This should be intuitively clear since the last column being a 4×1 matrix/vector lies in a four-dimensional vector space and hence can be expressed with exactly 4 basis vectors.

When the quantized transform coefficients (i.e. levels, zij i,j∈ {0, 1, 2, 3}, are received in the bitstream, they are rescaled (dequantized) to generate the coefficients w'ij i,j ∈ {0, 1, 2, 3}. These dequantized transform coefficients w'ij i,j ∈ {0, 1, 2, 3}, can then be parsed into groups that get combined and be multiplied with the last column (or vector) of the basis images to emulate the inverse transformation process (i.e. to generate the weights to weigh the basis images in the synthesis process). This observation implies that the reconstruction expression for the last column of the 4×4 residual signals $[\tilde{\Delta}_d \tilde{\Delta}_h \tilde{\Delta}_l \tilde{\Delta}_p]^T$ corresponding to the positions {d h l p} in FIG. 8 can be written as:

$$[\tilde{\Delta}_d\tilde{\Delta}_h\tilde{\Delta}_l\tilde{\Delta}_p]^T = (w'00-w'10+w'20-w'30/2)*[1\ 1\ 1\ 1]^T + \\ (w'01-w'11+w'21-w'31/2)*[10.5\ -0.5\ -1]^T + \\ (w'02-w'12+w'22-w'32/2)*[-1\ -1\ -1\ 1]^T + \\ (w'03-w'13+w'23-w'33/2)*[0.5\ -1\ 1\ -0.5]^T. \quad (7)$$

Note that once the four different combinations of scalar quantities w'ij in the four sets of parentheses above are calculated, right shifts and additions/subtractions can be used to complete the scaling/calculation of each basis vector. The calculation of the reconstructed samples is then straight forward. By starting at the far left side of a frame or immediately to the right of a slice boundary, it is known that the spatial prediction mode 2 (DC) may be used, and all pixels have a reference (or prediction) value (see p in equation (1) above) equal to 128. Thus the reconstructed samples $[r_d\ r_h\ r_l\ r_p]$ corresponding to the positions {d h l p} for this first left most block can be calculated as:

$$[r_d r_h r_l r_p]^T = [\tilde{\Delta}_d\tilde{\Delta}_h\tilde{\Delta}_l\tilde{\Delta}_p]^T + [128\ 128\ 128\ 128]^T; \quad (8)$$

where the reconstructed residual values $[\tilde{\Delta}_d\ \tilde{\Delta}_h\ \tilde{\Delta}_l\ \tilde{\Delta}_p]^T$ are calculated with equation (7). The 4×4 blocks to the right of this block can then be calculated by using the appropriate reconstructed values from the block to the left to generate the prediction signal component p in equation (1) (the prediction signal values generated depend on which spatial prediction mode was used to encode the 4×4 block being reconstructed). Examples of calculating the prediction values for other 4×4 blocks positioned below a slice boundary are now discussed.

Figure 11:
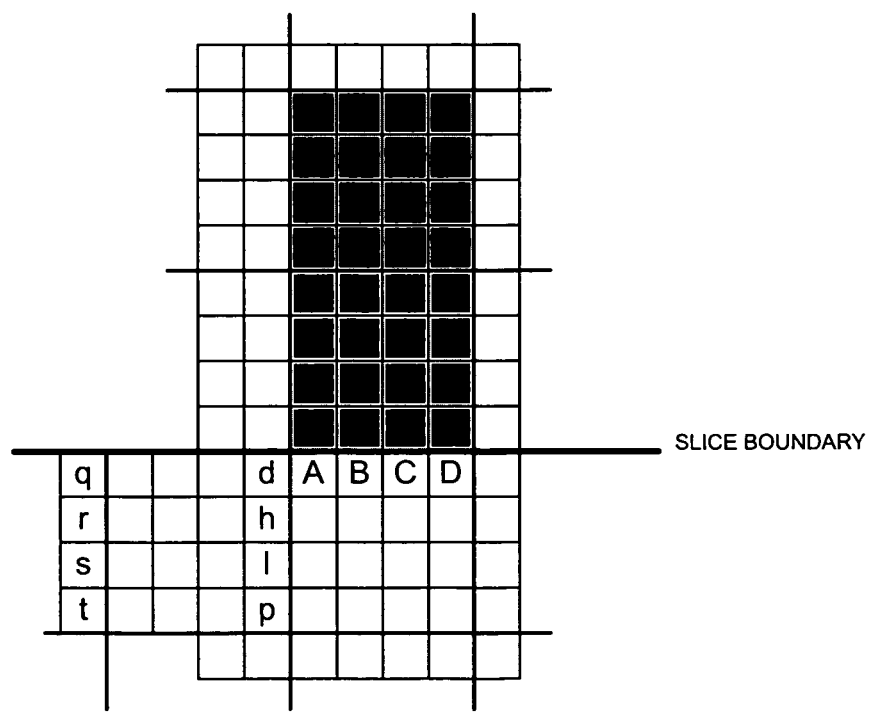
FIG. 11 illustrates a portion of multimedia samples located immediately below a slice boundary.

FIG. 11 illustrates a portion of multimedia samples located immediately below a slice boundary. The pixels may comprise luma and chroma values. The pixel positions {q r s t} represent previously reconstructed positions with pixel values $[r_q r_r r_s r_t]^T$ (e.g., calculated using equation 7 above). After reconstruction of the residual signal component values $[\tilde{\Delta}_d\ \tilde{\Delta}_h\ \tilde{\Delta}_l\ \tilde{\Delta}_p]^T$ for pixel positions {d h l p}, the prediction signal component values $[p_d\ p_h\ p_l\ p_p]^T$ for the same set of positions {d h l p} will be generated to finalize the reconstruction in accordance with equation (1). Given that the intra-4×4 coded 4×4 block containing the pixels {d, h, l, p} is immediately below a slice boundary, the intra-4×4 spatial prediction modes which could have been used to generate the prediction signal for this 4×4 block can be one of the following:

1. Intra-4×4 spatial prediction mode 1 (Horizontal):
   With respect to FIG. 11, the prediction signal component values are given by:

$$[p_d p_h p_l p_p]^T = [r_q r_r r_s r_t]^T, \quad (9)$$

comprising 0 additions, 0 arithmetic shifts, and 0 multiplications.

2. Intra-4×4 spatial prediction mode 2 (DC):
   If pixels at locations $\{q, r, s, t\}$ are not available, then the prediction signal component values are given by:

$$[p_d p_h p_l p_p]^T = [128\ 128\ 128\ 128]^T, \quad (10)$$

comprising 0 additions, 0 arithmetic shifts, and 0 multiplications.

If $\{q, r, s, t\}$ are available, then the prediction signal component values are given by:

$$[p_d p_h p_l p_p]^T = [u\ u\ u\ u]^T, \quad (11)$$

where $u = ((r_q + r_r + r_s + r_t) + 2) >> 2$,
   comprising 4 additions, 1 arithmetic shift and 0 multiplications.

3. Intra-4×4 spatial prediction mode 8 (Horizontal-Up):
   The prediction signal component values are given by:

$$p_d = ((r_r + 2r_s + r_t + 2) >> 2), \quad (12a)$$

$$p_h = ((r_s + 3r_t + 2) >> 2) = ((r_s + 2r_t + r_t + 2) >> 2), \quad (12b)$$

$$p_l = p_p = r_t, \quad (12c)$$

comprising 6 additions, 4 arithmetic shifts, and 0 multiplications, or 8 additions, 2 arithmetic shifts and 0 multiplications.

One more observation regarding the rescaling process (dequantizing zij i,j ∈ {0, 1, 2, 3} to generate w'ij i,j∈ {0, 1, 2, 3}), may reveal another source of significant computational savings. Note that the rescaling factors vij i,j∈{0, 1, 2, 3} which are used to scale zij ij ∈ {0, 1, 2, 3}, in addition to their dependence on the quantization parameter, also possess the following position related structure within a 4×4 matrix:

v 00 v 10 v 20 v 30
v 01 v 11 v 21 v 31
v 02 v 12 v 22 v 32
v 03 v 13 v 23 v 33 where three groups of rescaling factors including [v00, v20, v02 v22], [v11, v31, v13, v33] and [v10, v30, v01, v21, v12, v32, v03, v23] each have the same value for a given quantization parameter $QP_Y$. This can be used to advantage to reduce the number of multiplications associated with the generation of w'ij from zij as follows. Note that in the above given weighted basis vectors sum formula (equation 7) to reconstruct the 4×4 residual signal's last column, the first weight weighing the basis vector $[1\ 1\ 1\ 1]^T$ contains the sum of w'00 and w'20 rather than the individual values of these two weights. Therefore, instead of individually calculating the two values, w'00 and w'20, and consequently summing them up which would have commonly involved two integer multiplications, we can add z00 and z20 first and then rescale this sum with v00=v20, to get the same final value for (w'00+w'20) through one integer multiplication.

Other than these straightforward reductions in the computational steps for executing this partial decoding, also fast algorithms to calculate the desired last column and first (topmost) row of the 4×4 residual signal can be designed.

Another practical fact which may lead to low computational steps for this partial decoding process is that most of the time out of a maximum of 16 quantized coefficients within a residual signal block, a few, typically less than 5, are actually non-zero. The above in conjunction with this fact can be used to further reduce, almost halve, the number of multiplications involved.

Those of skill in the art will recognize that formula similar to equation (7) above may be derived to reconstruct any column, row, diagonal or any portion and/or combination thereof. For example, the top row values of the basis images (equations 6a to 6p above) could be combined with the corresponding transform coefficients w'ij to reconstruct the pixels just below a slice boundary (see pixel positions {A B C D} in FIG. 11), which are dependent on the same four pixel positions {d h l p} in the block to the left. Other subsets of multimedia samples that can be reconstructed using these methods will be apparent to those skilled in the art.

Figure 12:
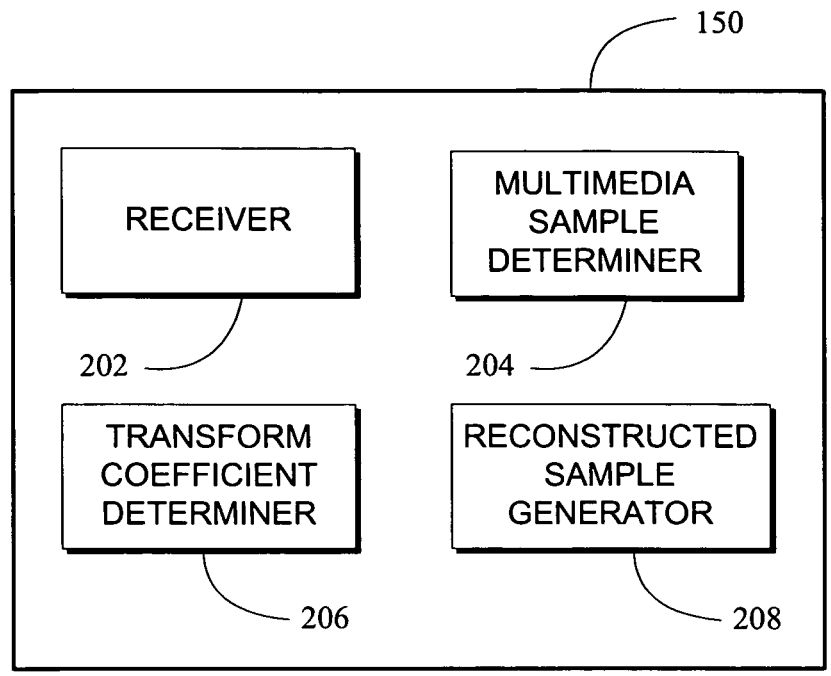
FIG. 12 is a block diagram illustrating another example of a decoder device that may be used in a system such as illustrated in FIG. 1.

FIG. 12 is a functional block diagram illustrating another example of a decoder device 150 that may be used in a system such as illustrated in FIG. 1. This aspect includes means for receiving transform coefficients, wherein the transform coefficients are associated with multimedia data, first determiner means for determining a set of multimedia samples to be reconstructed, second determiner means for determining a set of the received transform coefficients based on the multimedia samples to be reconstructed, and generator means for processing the determined set of transform coefficients to generate reconstructed samples corresponding to the determined set of multimedia samples. Some examples of this aspect include where the receiving means comprises a receiver 202, where the first determiner means comprises a multimedia sample determiner 204, where the second determiner means comprises a transform coefficient determiner 206 and where the generator means comprises a reconstructed sample generator 208.

Figure 13:
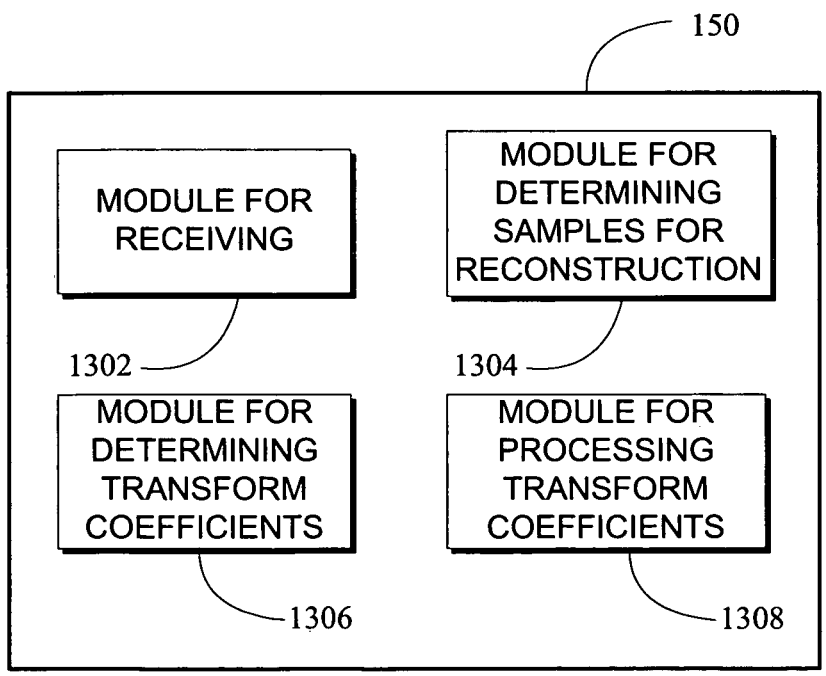
FIG. 13 is a block diagram illustrating another example of a decoder device 150 that may be used in a system such as illustrated in FIG. 1.

FIG. 13 is a functional block diagram illustrating another example of a decoder device 150 that may be used in a system such as illustrated in FIG. 1. This aspect includes means for receiving transform coefficients, wherein the transform coefficients are associated with multimedia data, first determiner means for determining a set of multimedia samples to be reconstructed, second determiner means for determining a set of the received transform coefficients based on the multimedia samples to be reconstructed, and generator means for processing the determined set of transform coefficients to generate reconstructed samples corresponding to the determined set of multimedia samples. Some examples of this aspect include where the receiving means comprises a module for receiving 1302, where the first determiner means comprises a module for determining samples for reconstruction 1304, where the second determiner means comprises a module for determining transform coefficients 1306 and where the generator means comprises a module for processing transform coefficients 1308.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core or ASIC core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, an optical storage medium, or any other form of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

Thus, methods and apparatus to perform highly efficient partial decoding of multimedia data have been described.

What is claimed is:

1. A method of processing multimedia data in at least one processor, comprising:
   receiving transform coefficients, wherein the transform coefficients are associated with the multimedia data;
   determining a set of multimedia samples to be reconstructed, based on at least one identified portion of lost multimedia data;
   determining a set of the received transform coefficients based on the multimedia samples to be reconstructed;
   processing, by a pre-processor, the determined set of transform coefficients to generate reconstructed samples corresponding to the determined set of multimedia samples, wherein the processing comprises:
   partitioning the determined set of transform coefficients into a plurality of groups;
   calculating a weight value for each of the plurality of groups, wherein the calculation is based on the encoding method which generated the transform coefficients;
   determining an array for each of the plurality of groups based on the encoding method which generated the transform coefficients; and
   generating the reconstructed samples of the multimedia data based on the weight values and the arrays;
   estimating a set of concealment multimedia samples for the portion of multimedia data that has been lost based on the reconstructed samples;
   communicating the concealment multimedia samples and originally encoded non-causal multimedia data to a video core processor; and
   decoding, by the video core processor, the concealment multimedia samples and the originally encoded non-causal multimedia data.

2. The method of claim 1, wherein processing comprises scaling the transform coefficients of the set.

3. The method of claim 2, wherein scaling the transform coefficients comprises dequantizing.

4. The method of claim 1, wherein the determined set of multimedia samples comprises multimedia samples upon which other multimedia samples are encoded in reference to.

5. The multimedia data processor of claim 4, wherein the weight value is the sum of scaled transform coefficients of each group.

6. The method of claim 1, wherein the determined set of multimedia samples comprises multimedia samples in a first slice of multimedia data that border a second slice of multimedia data.

7. The method of claim 1, wherein the received transformed coefficients are associated with a matrix of multimedia samples transformed as a set, and the reconstructed samples comprise a subset of the matrix of multimedia samples.

8. The method of claim 1, wherein the weight value is the sum of scaled transform coefficients of each group.

9. The method of claim 1, further comprising generating a set of transform coefficients corresponding to the set of estimated concealment multimedia samples.

10. The method of claim 1, wherein the reconstructed samples are non-causal to the estimated set of concealment multimedia samples.

11. The method of claim 1, further comprising:
   receiving a directivity mode indicator associated with each reconstructed sample; and
   estimating a set of concealment multimedia samples based on the reconstructed samples and the directivity mode indicators.

12. A multimedia data processor being configured to:
   receive transform coefficients, wherein the transform coefficients are associated with multimedia data;
   determine a set of multimedia samples to be reconstructed, based on at least one identified portion of lost multimedia data;
   determine a set of the received transform coefficients based on the multimedia samples to be reconstructed;
   process, by a pre-processor, the determined set of transform coefficients to generate reconstructed samples corresponding to the determined set of multimedia samples, wherein the pre-processor is configured to:
   partition the determined set of transform coefficients into a plurality of groups;

calculate a weight value for each of the plurality of groups, wherein the calculation is based on the encoding method which generated the transform coefficients;

determine an array for each of the plurality of groups based on the encoding method which generated the transform coefficients; and generate the set of reconstructed samples of the multimedia data based on the values and the arrays;

estimate a set of concealment multimedia samples for the portion of the multimedia data that has been lost based on the reconstructed samples;

communicate the concealment multimedia samples and originally encoded non-causal multimedia data to a video core processor; and decode, by the video core processor, the concealment multimedia samples and the originally encoded non-causal multimedia data.

13. The multimedia data processor of claim 12, wherein the multimedia data processor is further configured to scale the determined set of transform coefficients.

14. The multimedia data processor of claim 12, wherein the multimedia data processor is further configured to dequantize the determined set of transform coefficients.

15. The multimedia data processor of claim 12, wherein the set of multimedia samples comprises multimedia samples upon which other multimedia samples are encoded in reference to.

16. The multimedia data processor of claim 12, wherein the set of multimedia samples comprises multimedia samples in a first slice of multimedia data that border a second slice of multimedia data.

17. The multimedia data processor of claim 12, wherein the received transformed coefficients are associated with a matrix of multimedia samples transformed as a set, and the reconstructed samples comprise a subset of the matrix of multimedia samples.

18. The multimedia data processor of claim 12, wherein the multimedia data processor is further configured to generate a set of transform coefficients corresponding to the set of estimated concealment multimedia samples.

19. The multimedia data processor of claim 12, wherein the reconstructed samples are non-causal to the estimated set of concealment multimedia samples.

20. The multimedia data processor of claim 12, wherein the multimedia data processor is further configured to:
receive a directivity mode indicator associated with each reconstructed sample; and
estimate a set of concealment multimedia samples based on the reconstructed samples and the directivity mode indicators.

21. An apparatus for processing multimedia data, comprising: a receiver to receive transform coefficients, wherein the transform coefficients are associated with multimedia data;
a first determiner to determine a set of multimedia samples to be reconstructed, based on at least one identified portion of lost multimedia data;
a second determiner to determine a set of the received transform coefficients based on the multimedia samples to be reconstructed;
a generator to process, by a pre-processor, the determined set of transform coefficients to generate reconstructed samples corresponding to the determined set of multimedia samples, wherein the generator is configured to:
partition the determined set of transform coefficients into a plurality of groups;

calculate a weight value for each of the plurality of groups, wherein the calculation is based on the encoding method which generated the transform coefficients;

determine an array for each of the plurality of groups based on the encoding method which generated the transform coefficients; and generate the set of reconstructed samples of the multimedia data based on the values and the arrays;

an estimator to estimate a set of concealment multimedia samples for the portion of the multimedia data that has been lost based on the reconstructed samples;

a communicator for communicating the concealment multimedia samples and originally encoded non-causal multimedia data to a video core processor; and the video core processor for decoding the concealment multimedia samples and the originally encoded non-causal multimedia data.

22. The apparatus of claim 21, wherein the generator scales the determined set of transform coefficients.

23. The apparatus of claim 21, wherein the generator dequantizes the determined set of transform coefficients.

24. The apparatus of claim 21, wherein the determined set of multimedia samples comprises multimedia samples upon which other multimedia samples are encoded in reference to.

25. The apparatus of claim 21, wherein the determined set of multimedia samples comprises multimedia samples in a first slice of multimedia data that border a second slice of multimedia data.

26. The apparatus of claim 21, wherein the received transformed coefficients are associated with a matrix of multimedia samples transformed as a set, and the reconstructed samples comprise a subset of the matrix of multimedia samples.

27. The apparatus of claim 21, wherein the weight value is the sum of scaled transform coefficients of each group.

28. The apparatus of claim 21, wherein the estimator generates a set of transform coefficients corresponding to the set of estimated concealment multimedia samples.

29. The apparatus of claim 21, wherein the reconstructed samples are non-causal to the estimated set of concealment multimedia samples.

30. The apparatus of claim 21, wherein the receiver receives a directivity mode indicator associated with each reconstructed sample, and the apparatus further comprises an estimator to estimate a set of concealment multimedia samples based on the reconstructed samples and the directivity mode indicators.

31. An apparatus for processing multimedia data, comprising:
means for receiving transform coefficients, wherein the transform coefficients are associated with multimedia data;
first determiner means for determining a set of multimedia samples to be reconstructed, based on at least one identified portion of lost multimedia data;
second determiner means for determining a set of the received transform coefficients based on the multimedia samples to be reconstructed;
generator means for processing, by a pre-processor, the determined set of transform coefficients to generate reconstructed samples corresponding to the determined set of multimedia samples, wherein the generator means is configured to:
partition the determined set of transform coefficients into a plurality of groups;

calculate a weight value for each of the plurality of groups, wherein the calculation is based on the encoding method which generated the transform coefficients;
to determine an array for each of the plurality of groups based on the encoding method which generated the transform coefficients; and
to generate the set of reconstructed samples of the multimedia data based on the values and the arrays;
means for estimating a set of concealment multimedia samples for the portion of the multimedia data that has been lost based on the reconstructed samples;
means for communicating the concealment multimedia samples and originally encoded non-causal multimedia data to a video core processor; and
means for decoding the concealment multimedia samples and the originally encoded non-causal multimedia data.

32. The apparatus of claim 31, wherein the generator means scales the determined set of transform coefficients.

33. The apparatus of claim 31, wherein the generator means dequantizes the determined set of transform coefficients.

34. The apparatus of claim 31, wherein the set of multimedia samples comprises multimedia samples upon which other multimedia samples are encoded in reference to.

35. The apparatus of claim 31, wherein the set of multimedia samples comprises multimedia samples in a first slice of multimedia data that border a second slice of multimedia data.

36. The apparatus of claim 31, wherein the received transformed coefficients are associated with a matrix of multimedia samples transformed as a set, and the reconstructed samples comprise a subset of the matrix of multimedia samples.

37. The apparatus of claim 31, wherein the weight value is the sum of scaled transform coefficients of each group.

38. The apparatus of claim 31, wherein the estimator means generates a set of transform coefficients corresponding to the set of estimated concealment multimedia samples.

39. The apparatus of claim 31, wherein the reconstructed samples are non-causal to the estimated set of concealment multimedia samples.

40. The apparatus of claim 31, wherein the receiving means receives a directivity mode indicator associated with each reconstructed sample, and the apparatus further comprises means for estimating a set of concealment multimedia samples based on the reconstructed samples and the directivity mode indicators.

41. A non-transitory machine readable medium comprising instructions that upon execution of the instructions by a processor cause a machine to:
receive transform coefficients, wherein the transform coefficients are associated with multimedia data;
determine a set of multimedia samples to be reconstructed, based on at least one identified portion of lost multimedia data;
determine a set of the received transform coefficients based on the multimedia samples to be reconstructed;
process, by a pre-processor, the determined set of transform coefficients to generate reconstructed samples corresponding to the determined set of multimedia samples, wherein the pre-processor is configured to:
partition the determined set of transform coefficients into a plurality of groups;
calculate a weight value for each of the plurality of groups, wherein the calculation is based on the encoding method which generated the transform coefficients;
determine an array for each of the plurality of groups based on the encoding method which generated the transform coefficients; and
generate the set of reconstructed samples of the multimedia data based on the values and the arrays;
estimate a set of concealment multimedia samples for the portion of the multimedia data that has been lost based on the reconstructed samples;
communicate the concealment multimedia samples and originally encoded non-causal multimedia data to a video core processor; and
decode, by the video core processor, the concealment multimedia samples and the originally encoded non-causal multimedia data.

42. The non-transitory machine readable medium of claim 41, wherein the instructions further cause the machine to scale the determined set of transform coefficients.

43. The non-transitory machine readable medium of claim 41, wherein the instructions further cause the machine to dequantize the determined set of transform coefficients.

44. The non-transitory machine readable medium of claim 41, wherein the set of multimedia samples comprises multimedia samples upon which other multimedia samples are encoded in reference to.

45. The non-transitory machine readable medium of claim 41, wherein the set of multimedia samples comprises multimedia samples in a first slice of multimedia data that border a second slice of multimedia data.

46. The non-transitory machine readable medium of claim 41, wherein the received transformed coefficients are associated with a matrix of multimedia samples transformed as a set, and the reconstructed samples comprise a subset of the matrix of multimedia samples.

47. The non-transitory machine readable medium of claim 41, wherein the weight value is the sum of scaled transform coefficients of each group.

48. The non-transitory machine readable medium of claim 41, wherein the instructions further cause the machine to generate a set of transform coefficients corresponding to the set of estimated concealment multimedia samples.

49. The non-transitory machine readable medium of claim 41, wherein the reconstructed samples are non-causal to the estimated set of concealment multimedia samples.

50. The non-transitory machine readable medium of claim 41, wherein the instructions further cause the machine to:
receive a directivity mode indicator associated with each reconstructed sample; and
estimate a set of concealment multimedia samples based on the reconstructed samples and the directivity mode indicators.

* * * * *